March 10, 1942.
C. R. HANNA ET AL
2,276,036
PNEUMATIC THICKNESS GAUGE
Filed Nov. 23, 1940
2 Sheets-Sheet 1
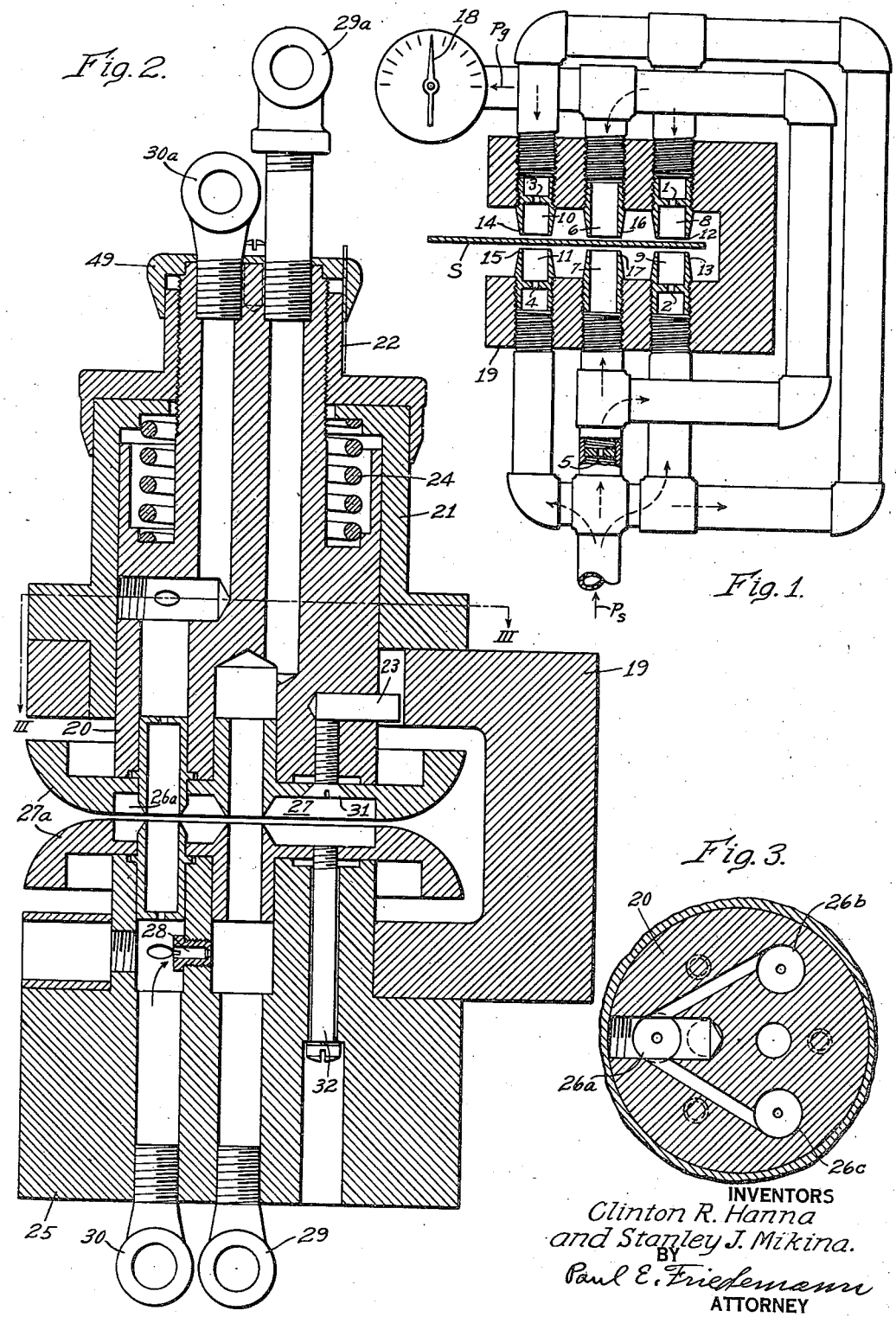
INVENTORS
Clinton R. Hanna
and Stanley J. Mikina.
BY
Paul E. Friedemann
ATTORNEY March 10, 1942. C. R. HANNA ET AL 2,276,036
PNEUMATIC THICKNESS GAUGE
Filed Nov. 23, 1940 2 Sheets-Sheet 2
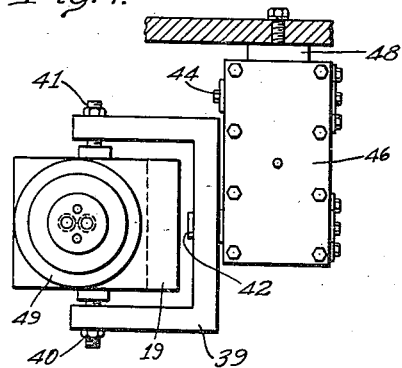
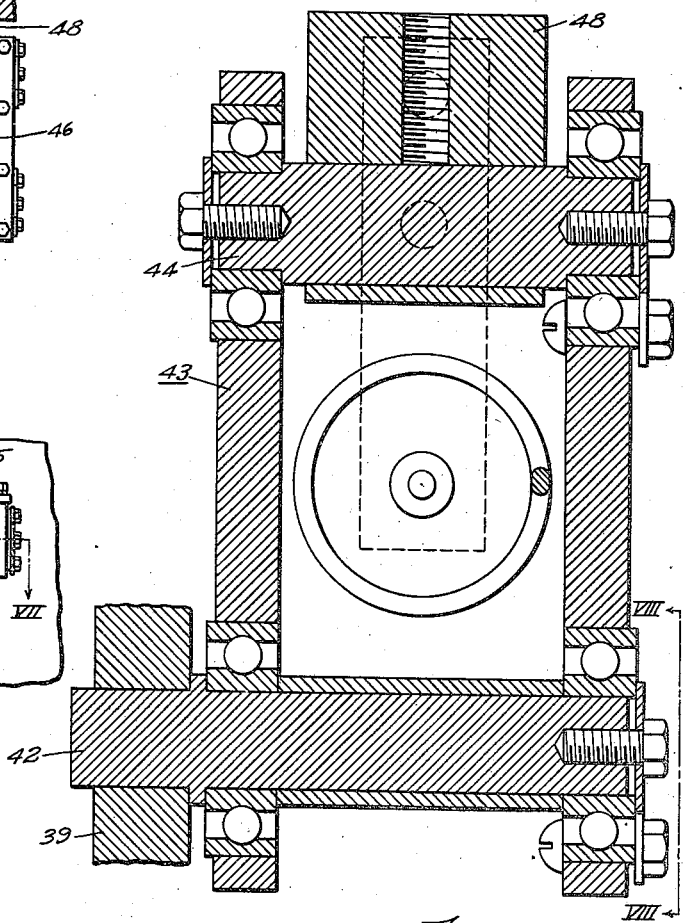
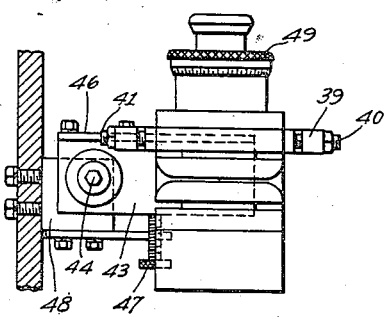
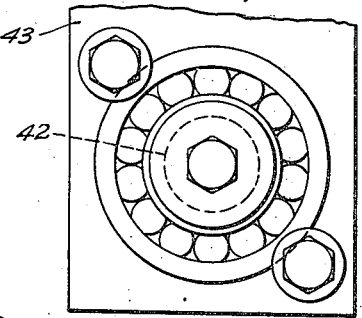
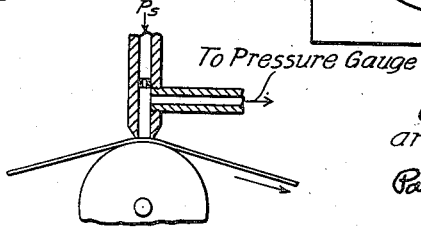
WITNESSES:
INVENTORS
Clinton R. Hanna
and Stanley J. Mikina.
BY
Paul E. Friedemann
ATTORNEY Patented Mar. 10, 1942

2,276,036

UNITED STATES PATENT OFFICE 2,276,036

PNEUMATIC THICKNESS GAUGE

Clinton R. Hanna, Pittsburgh, and Stanley J. Mikina, Wilkinsburg, Pa., assignors to Westinghouse Electric & Manufacturing Company, East Pittsburgh, Pa., a corporation of Pennsylvania Application November 23, 1940, Serial No. 366,876

11 Claims. (Cl. 33—174)

Our invention relates to a detector system including a gauge for indicating or detecting the thickness of an object that is inserted in the gauge. More specifically, the gauge is especially adapted to detecting or measuring and continuously indicating the thickness of flat sheet materials, such as steel, paper and the like, while the material is passing through the gauge at comparatively high velocities in the course of processing or manufacture of the material to specified thicknesses, as in the rolling of sheet metal. Moreover, the gauging is effected without any bodily contact between the gauge and the material being measured.

The gauges described in the prior art for this purpose, whether utilizing electrical or mechanical measuring systems, derive their actuation from the relative positions of probes or rollers bearing against the opposite sides of the sheet material, so that the spacing of the probes or rollers is determined by the thickness of the gauged material and this probe or roller deflection is then suitably amplified mechanically or electrically and caused to give an indication of thickness on a suitable meter or scale. The principal disadvantages of such contacting gauges are the undesirable marking of the sheet as a result of the necessary contact pressure between the sheet and the gauging rollers, and the gauging inaccuracies resulting from the wear of the contacting rollers through abrasion by the moving sheet, necessitating frequent gauge recalibration. Other sources of error arising from lost motion or temperature effects in the mechanical or electromechanical amplification of the roller deflection are frequently present due to the high amplification required to convert a thickness error of, say, one thousandth of an inch to several inches of indicating meter deflection.

An object of our invention is to eliminate the above difficulties inherent in prior art gauges by elimination of sheet-to-gauge contact by supporting the measured sheet on an air spring formed by opposed jets of air, and by utilizing the pressure drop through gauging orifices immediately adjacent to the surface of the measured sheet for a measure of thickness which can be indicated on a standard pressure gauge that is calibrated to read in thickness error, without the necessity for additional amplification of any sort.

Another object of our invention is to provide a control system embodying a pneumatic gauge which system will be effective to continuously indicate the thickness of a strip of sheet material while it is passing through rollers or the like.

Another object of our invention is to provide a pneumatic gauge which is simple and inexpensive and at the same time highly reliable in operation.

Other objects and advantages will become more apparent from a study of the following specification when considered in conjunction with the accompanying drawings, in which:

Figure 1 is a side view, partly in cross-section, showing a pneumatic gauge embodying the principles of our invention;

Fig. 2 is a longitudinal cross-sectional view of a modification of the pneumatic device shown in Fig. 1 which is particularly adapted to steel mill control;

Fig. 3 is a cross-sectional view taken along the line III—III of Fig. 2;

Figs. 4, 5, and 6 are top, front, and rear views, respectively, showing a mounting structure, in reduced scale, for the pneumatic device illustrated in Fig. 2;

Fig. 7 is an enlarged cross-sectional view taken along the line VII—VII of Fig. 5;

Fig. 8 is a partial side view taken along the line VIII—VIII of Fig. 7; and

Fig. 9 is a modification showing a single nozzle used as a detector.

Referring more particularly to Fig. 1 of the drawings, the measured sheet or strip S is inserted between gauging and sheet supporting nozzles which are mounted in a rigid yoke 19 straddling the sheet. The nozzles are connected to a source of air at a constant pressure $P_s$ through a number of orifices which are in series with the nozzle openings adjacent to the sheet surface. In the schematic example shown, the nozzle pairs 12, 13, and 14, 15 serve to support the sheet in a substantially central position between the nozzles by virtue of the jet of air discharging from these nozzles which acts as an aerodynamic spring of great stiffness to support the sheet and to center it. The spring action in question is secured by means of the supply orifices 1, 2, and 3, 4 which limit the flow of air into the volumes 8, 9 and 10, 11 between the orifices and the nozzle openings adjacent to the sheet surface. The presence of the supply orifices 1, 2, and 3, 4 makes the pressure in the volumes 8, 9 and 10, 11, a function of the discharge nozzle openings at 12, 13 and 14, 15.

When the nozzle area is increased, the pressure drops, and when the nozzle area is decreased the pressure rises. Thus, it is evident that an air pressure force on the sheet that is proportional to the sheet displacement and opposing the displacement, or in effect a spring is obtained, because, for example, when the sheet is displaced upwardly, it reduces the air discharge areas at 12 and 14 causing a rise in the pressure acting on the top side of the sheet, while at the same time the nozzle discharge areas are increased on the underside of the sheet, causing a reduction in the air pressure on the underside of the sheet.

An example of the magnitude of the aerodynamic spring is given from a practical design. With a supply pressure $P_s=100$ lbs./in.$^2$, with the orifices 1, 2, and 3, 4, equal to .052 in. dia., with the inside nozzle diameter at 8, 9 and 10, 11 equal to 5/16 inch, and with an air gap between the nozzle edges and the sheet equal to 5 mils on each side of the sheet, a pressure change of 5 lbs./in.$^2$ can be obtained in each volume 8, 9 and 10, 11 for a displacement of the sheet from its middle position equal to 1 mil. Assuming three pairs of such centering nozzles, equally spaced on a circle, the air spring scale corresponding to the above pressure change is $$S = \frac{6 \times 5 \times \frac{\pi}{4} \times \left(\frac{5}{16}\right)^2}{.001''} = 2300 \text{ lbs./inch}$$

Thus a centering force of 2.3 lbs. is realized for a sheet displacement of one thousandth of an inch from the middle position.

Located midway between the centering nozzles in Figure 1 is a pair of gauging nozzles 16, 17 whose function is to determine a pressure proportional to the thickness of the sheet. These gauging nozzles are supplied with air from the constant pressure source $P_s$ through the common orifice 5. Since the same orifice throttles the air flow to both nozzles 16 and 17, the pressure in the line 6, 7 depends upon the sum of the discharge nozzle areas exposed between the nozzle edges and the sheet on both sides of the sheet. Hence, as the sheet gets thicker the discharge area is reduced and the gauging pressure $P_t$ rises, while, as the sheet gets thinner, the discharge area at the nozzles increases and the pressure $P_t$ drops. However, the gauging pressure $P_t$ thus determined is independent of the vertical position of the sheet between the gauging nozzles, since as the sheet is displaced from its mid-position the decrease in discharge area on one side is substantially compensated for by an equal increase in discharge area on the other side of the sheet. The use of two such parallel gauging nozzles thus eliminates the necessity for accurate location of the sheet between the gauging points. It may be said that, within the range of vertical sheet movement permitted by the centering air spring, the gauging pressure is unaffected by changes in sheet elevation but responds only to changes in sheet thickness. The pressure $P_t$ may be indicated by means of a standard pressure gauge 18 calibrated to read in terms of deviation in sheet thickness from the desired value. For example, with a supply pressure $P_s=100$ lbs./in.$^2$ with a .073" diameter, supply orifice for the two nozzles (each of 1/4" i. d.) and with a 5 mil. air gap between each nozzle and the sheet surface, a pressure change in $P_t$ of 2½ lbs./in.$^2$ is obtained for a change in sheet thickness equal to one mil.

Figs. 2 and 3 show a modification of our pressure gauge which is particularly adapted for application to the gauging of sheet metal in rolling mills. Element 19 is a rigid rectangular yoke whose arms hold the nozzle assemblies in fixed relation to each other. The upper nozzle block 20 is a cylindrical piece which slides in the supporting sleeve 21 and can be moved vertically by means of its integral micrometer screw and the threaded collar 22. The cylindrical nozzle block 20 is prevented from rotation by the pin 23 which slides in a slot in the sleeve 21. Lost motion in the threads is taken up by the compression spring 24 which also serves as a safety relief permitting the gauging jaws to open wide in case a sheet with deep wrinkles or other obstructions attempts to pass through the gauge. The lower nozzle block 25 is rigidly attached to the lower arm of the gauge yoke 19. Mounted in each nozzle block is a set of three equally spaced sheet-centering nozzles 26a, 26b, and 26c with their associated supply orifices and one gauging nozzle, assembly 27. The item 27 comprises a centrally located gauging nozzle turned integrally with a sheet guide ring 27a and a clamp for the centering nozzles. The hardened steel guide ring encircles each nozzle block completely and serves to protect the thin nozzle edges from damage as the gauge is pushed onto the moving sheet, and serves also to take the blow of any obstruction in the form of sheet wrinkles or ragged ends carried by the sheet through the gauge. The common orifice 28 supplies the air to both gauging nozzles, which are connected together outside the yoke by means of a flexible air hose at the pipe fittings shown. The lower right-hand fitting 29 is a T, from which one arm leads to the upper right-hand elbow 29a, while the other arm is connected to an indicating pressure gauge (such as 18 in Fig. 1) suitably calibrated in terms of thickness or thickness error. The lower left-hand fitting 30 at the gauge is also a T, one arm of which is connected to the constant supply pressure $P_s$, while the other arm leads this same pressure to the upper nozzle block through the upper left elbow 30a. To simplify piping, the connections of the centering orifices and nozzles in each block to the source of supply pressure $P_s$ have been made by means of internal drilled holes. Thus there are only two air lines leading to the gauge, one the air supply line and the other the connection to the thickness indicating pressure gauge.

The centering nozzles 26a, 26b, and 26c are held in place by means of integrally turned flanges which are clamped in a counterbored recess in the nozzle blocks by means of the guide ring web. The guide rings 27a are attached to the respective nozzle blocks by the screws 31 and 32, assembled successively in that same order. These guide rings are also provided with a series of drilled holes around the nozzle block periphery to allow for the free discharge to the atmosphere of the air issuing within the confines of the guide rings from the six centering nozzles and the two gauging nozzles.

With the distribution of sheet centering nozzles shown, a righting moment on the sheet is produced for an angular displacement of the sheet, as well as a centering force for lateral sheet displacements. There is, of course, a corresponding moment and force reaction on the gauge structure. In certain applications, such as the gauging of rolled sheet steel which is subject to tension so that the sheet pass line is defined by mill roll and reel geometry, the centering forces and moments discussed above can serve to position the thickness gauge over the sheet. In such cases the gauge is mounted so as to have freedom of movement laterally as well as angularly of the sheet surface, and the gauge weight is balanced with respect to the necessary pivot axes so that the air righting moments and forces can be utilized to the fullest advantage in positioning the gauge.

Such a mounting is shown in Figs. 4 to 7, inclusive. The yoke 19 rests on ball-bearings supported by the screws 40 and 41. The yoke ball-bearings are of necessity mounted above the sheet pass-line, and the gauge mass is slightly pendulous with respect to the axis defined by screws 40 and 41, which assists in keeping the gauge plumb with respect to the vertical plane parallel to the direction of rolling of the sheet. The screws 40 and 41 are attached to a fork 39 which is fixed on a shaft 42 that can rotate on ball-bearings in the supporting frame 43. The frame 43, in turn, has freedom of rotation about the axis 44, which is rigidly supported on the gauge stand. The degree of freedom about axes at 44, 4a, and 40 thus allow the gauge to accommodate itself to a vertical displacement of the sheet as well as to an angular sheet tilt in any direction without binding. Ball bearings are used throughout to reduce to a minimum the frictional forces that the air centering forces work against in maintaining the gauge position over the sheet. The axis at 42 passes substantially through the center of the sheet, so that a drag of the sheet on the gauge caused by wrinkles or other obstructions passing through the gauge will not cause jamming of the gauge against the sheet because then the sheet pull has no turning moment about the gauge pivot axis through 42. The gauge is also gravitationally balanced about the axis through 42 by means of the heavy flange shown on the lower nozzle block. The weight of the gauge is balanced by a flexible compression spring 45 within the frame 43, 46. The spring set-up force can be adjusted by means of the screw 47 in order to bring the gauge pass line to the desired elevation.

In a rolling mill application, the block 48 of the gauge supporting frame will usually be mounted on a member that can slide on ways parallel to the mill rolls. To measure the moving sheet the gauge is slid on the ways and onto the sheet, which is guided between the nozzle blocks by the curved surface of the gauge guide rings. The nozzles are brought together by means of the micrometer screw and the threaded graduated collar 49 so that at the specified thickness setting (as indicated by the collar graduation) an air gap of, say, 5 mils will be established between the sheet surface and the measuring and centering nozzles. The pressure gauge for reading the gauging pressure $P_g$ will have been calibrated to read zero thickness error in this condition.

Any change then in the thickness of the sheet which will change the gauge air gap above or below the 5 mil setting for zero thickness error will be indicated on the calibrated pressure gauge, to the extent of 2½ lbs./in.$^2$ change for each mil in thickness deviation. The average pressure $P_g$ corresponding to the 5 mil air gap when the sheet thickness is correct, amounting to about 15 lbs./in.$^2$ is suppressed in the calibrated pressure gauge by means of a spring acting on the bellows or "Bourdon tube" element of the gauge, so that the 5 lbs./in.$^2$ pressure change corresponding to a sheet thickness change of ±.001" can be indicated over the full scale of a 5 lbs./in.$^2$ gauge, say, over a standard dial arc of 270°.

In a rolling mill application the source of air for the thickness gauge may be the mill compressed air supply, fed through a small booster compressor (not shown) to iron out the mill air pressure fluctuations.

The booster compressor may be fed from the mill air line through a pressure reducing-valve, and the supply pressure $P_s$ to the thickness gauge may then be kept constant by means of a standard relief valve set at, say, 100 lbs./in.$^2$.

In reducing the above ideas to practice with models and tests, it was found that for the case of a sheet inserted in the gauge and held stationary, there was a tendency to vibrate the sheet as a result of self-excited air disturbing forces caused by the time delay in establishing the centering pressure following a sheet displacement from the middle position. The time delay, arising from the fact that time is required to fill a given volume with air, resulted in a delayed air spring force having a force component in phase with the sheet velocity and thus being capable of doing work on the sheet motion and of maintaining a sheet vibration against whatever small damping forces might be present. Analysis indicated that if the time delay in question were increased beyond a certain point, as by increasing the previously described air volumes 8, 9, 10, and 11 of Figure 1, a stable sheet positioning would again be realized, with no phase distortion to give an exciting component to the delayed spring force. This was tried and was found completely successful in eliminating the sheet vibration. In practice, to get the necessary air chamber volume of about 6 cubic inches between each centering orifice and discharge nozzle, it would only be necessary to place the orifices 1, 2, 3, and 4 in the air lines some distance away from the discharge nozzles. For the case of a moving sheet, however, such as steel in the process of rolling, the above expedient is not necessary, since under dynamic conditions the tendency for the sheet to vibrate is negligible. This is due to the fact that a given section of the rapidly moving sheet (1800 ft./min. or faster) does not stay long enough between the centering nozzles to have enough energy put into it by the exciting forces to develop any appreciable amplitude of vibration.

Fig. 9 shows a modification of our invention wherein a single nozzle is used for detection in the case where a sheet is supported by a fixed surface such as a roller.

In conclusion, the advantages of the gauge described herein over the prior-art gauges may be summarized as possessing a high degree of thickness error amplification without complicated mechanical linkages or electromechanical amplifying systems; and providing no sheet-to-gauge contact, thus leaving the sheet unmarked, eliminating gauge wear, and making possible the gauging of hot-rolled metals, something that has not been possible heretofore on account of the rapid wear and deterioration of any sheet contacting element by the hot metal.

We are, of course, aware that others, particularly after having had the benefit of the teachings of our invention, may devise other devices embodying our invention, and we, therefore, do not wish to be limited to the specific showings made in the drawings and the descriptive disclosure hereinbefore made, but wish to be limited only by the scope of the appended claims and such prior art that may be pertinent.

We claim as our invention:

1. Apparatus for measuring the thickness of sheet material including a source of air pressure, a pair of nozzles connected to said source and located in proximity to said sheet material on opposite surfaces of a portion thereof, and pneumatically responsive indicating means responsive to changes of pressure due to changes of the gaps between the nozzles and sheet material portion for measuring changes in thickness of said sheet and an additional pair of oppositely disposed nozzles connected to said source and located in proximity to and at opposite surfaces of a portion of said sheet material for pneumatically supporting said sheet material without mechanical contact.

2. Apparatus for detecting the thickness of sheet material including a source of air pressure, a pair of nozzles connected to said source and located in proximity to said sheet material on opposite surfaces of a portion thereof, and detector means responsive to changes of pressure due to changes of the gaps between the nozzles and sheet material portion for detecting changes in thickness of said sheet, and a plurality of additional pairs of nozzles, each pair also arranged on opposite surface portions of the sheet and also under pneumatic pressure for supporting said sheet without mechanical contact.

3. Apparatus for measuring the thickness of sheet material including a source of air pressure, a pair of nozzles connected to said source and located in proximity to said sheet material on opposite surfaces of a portion thereof, and pneumatically responsive indicating means responsive to changes of pressure due to changes of the gaps between the nozzles and sheet material portion for measuring changes in thickness of said sheet, and a plurality of additional pairs of nozzles, each pair also arranged on opposite surface portions of the sheet and also under pneumatic pressure for supporting said sheet without mechanical contact.

4. Apparatus for detecting the thickness of sheet material including a source of air pressure, a pair of nozzles connected to said source and located in proximity to said sheet material on opposite surfaces of a portion thereof, and detector means responsive to changes of pressure due to changes of the gaps between the nozzles and sheet material portion for detecting changes in thickness of said sheet, and three additional pairs of nozzles substantially equidistantly spaced from each other and from the detector means for forming an air-cushioned, contactless, suspension means for the sheet.

5. Apparatus for measuring the thickness of sheet material including a source of air pressure, a pair of nozzles connected to said source and located in proximity to said sheet material on opposite surfaces of a portion thereof, and pneumatically responsive indicating means responsive to changes of pressure due to changes of the gaps between the nozzles and sheet material portion for measuring changes in thickness of said sheet, and three additional pairs of nozzles substantially equidistantly spaced from each other and from the detector means for forming an air-cushioned, contactless, suspension means for the sheet.

6. Apparatus for detecting the thickness of sheet material including a source of air pressure, a nozzle connected to said source and located in proximity to a portion of the sheet material surface, and detector means responsive to changes of the gap between the nozzle and sheet surface for detecting changes in thickness of the sheet, and pivotal supporting means for said detecting apparatus having a plurality of pivots disposed at right angles for allowing yieldable adjustment of position of the detector apparatus with respect to the sheet.

7. Apparatus for detecting the thickness of sheet material including a source of air pressure, a nozzle connected to said source and located in proximity to a portion of the sheet material surface, and detector means responsive to changes of the gap between the nozzle and sheet surface for detecting changes in thickness of the sheet, and pivotal supporting means having three axes two of which are parallel to each other and the third of which is disposed at right angles with respect to the other two to permit universal and automatic adjustment of the position of the detector apparatus with respect to the sheet.

8. Apparatus for detecting the thickness of sheet material including a source of air pressure, a pair of nozzles connected to said source and located in proximity to said sheet material on opposite surfaces of a portion thereof, and detector means responsive to changes of pressure due to changes of the gaps between the nozzles and sheet material portion for detecting changes in thickness of said sheet, and a plurality of additional pairs of nozzles, each pair also arranged on opposite surface portions of the sheet and also under pneumatic pressure for supporting said sheet without mechanical contact, said last mentioned nozzles having orifices therein which are spaced back of the nozzle openings so as to provide a predetermined, substantially enclosed volume of air between the orifices and nozzle openings.

9. Apparatus for detecting the thickness of sheet material including a source of air pressure, a pair of nozzles connected to said source and located in proximity to said sheet material on opposite surfaces of a portion thereof, and detector means responsive to changes of pressure due to changes of the gaps between the nozzles and sheet material portion for detecting changes in thickness of said sheet, and three additional pairs of nozzles substantially equidistantly spaced from each other and from the detector means for forming an air-cushioned, contactless, suspension means for the sheet together with a yoke for supporting all of said nozzles and spring means for permitting yieldable retraction of one of the sets of nozzles on one side of the sheet in the event that an abnormal enlargement of the sheet is encountered.

10. Apparatus for detecting the thickness of sheet material including a source of air pressure, a pair of nozzles connected to said source and located in proximity to said sheet material on opposite surfaces of a portion thereof, and detector means responsive to changes of pressure due to changes of the gaps between the nozzles and sheet material portion for detecting changes in thickness of said sheet, and three additional pairs of nozzles substantially equidistantly spaced from each other and from the detector means for forming an air-cushioned, contactless, suspension means for the sheet, said last mentioned nozzles having orifices therein which are spaced back of the nozzle openings so as to provide a predetermined, substantially enclosed volume of air between the orifices and nozzle openings.

11. Apparatus for detecting the thickness of sheet material including a source of air pressure, a pair of nozzles connected to said source and located in proximity to said sheet material on opposite surfaces of a portion thereof, and detector means responsive to changes of pressure due to changes of the gaps between the nozzles and sheet material portion for detecting changes in thickness of said sheet, and three additional pairs of nozzles substantially equidistantly spaced from each other and from the detector means for forming an air-cushioned, contactless, suspension means for the sheet, oppositely disposed block means on opposite surfaces of the sheet and which are perforated so as to support said nozzles, a yoke for supporting said block means and yieldable means for allowing retraction of one of the block means in the event that an abnormal thickness of sheet is encountered.

CLINTON R. HANNA.
STANLEY J. MIKINA.